United States Patent
Champel et al.

(10) Patent No.: US 11,363,086 B2
(45) Date of Patent: Jun. 14, 2022

(54) METHOD AND NETWORK EQUIPMENT FOR ESTABLISHING A MANIFEST

(71) Applicant: INTERDIGITAL MADISON PATENT HOLDINGS, SAS, Paris (FR)

(72) Inventors: Mary-Luc Champel, Marpire (FR); Sebastien Lasserre, Thorigné Fouillard (FR); Franck Galpin, Thorigne-Fouillard (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 15/598,270

(22) Filed: May 17, 2017

(65) Prior Publication Data

US 2017/0346866 A1    Nov. 30, 2017

(30) Foreign Application Priority Data

May 25, 2016    (EP) .................................... 16305604

(51) Int. Cl.
*H04L 29/06*    (2006.01)
*H04N 21/234*    (2011.01)
(Continued)

(52) U.S. Cl.
CPC .............. *H04L 65/60* (2013.01); *H04L 67/02* (2013.01); *H04N 21/2187* (2013.01);
(Continued)

(58) Field of Classification Search
CPC ... H04L 67/02; H04L 65/607; H04L 65/4084; H04L 65/601; H04L 65/60;
(Continued)

(56) References Cited

U.S. PATENT DOCUMENTS

| 8,717,405 B2 | 5/2014 | Li et al. |
| 9,025,670 B2 | 5/2015 | Tourapis et al. |

(Continued)

FOREIGN PATENT DOCUMENTS

| CN | 102256154 A | 11/2011 |
| CN | 102685532 A | 9/2012 |

(Continued)

OTHER PUBLICATIONS

Niamut, Omar A., Emmanuel Thomas, Lucia D'Acunto, Cyril Concolato, Franck Denoual, and Seong Yong Lim. "MPEG DASH SRD: spatial relationship description." In Proceedings of the 7th International Conference on Multimedia Systems, p. 5. ACM, 2016. (Year: 2016).*

(Continued)

*Primary Examiner* — Hamza N Algibhah
(74) *Attorney, Agent, or Firm* — Volpe Koenig

(57) ABSTRACT

Network equipment for establishing a manifest to be provided to a requesting terminal configured to receive a multimedia content divided into segments from a network equipment, each segment being available in one or more representations, said manifest listing available representations for the multimedia content and specifying a plurality of adaptation sets, each adaptation set defining a spatial object of the multimedia content, the spatial objects of the adaptation sets defining a whole spatial object is described. The network equipment includes at least one memory and at least one processing circuitry configured to define, in the manifest, a type of mapping of the multimedia content to the whole spatial object and a point of reference in one adaptation set of reference amongst the adaptation sets, and associate depth information with each adaptation set.

12 Claims, 4 Drawing Sheets

(51) Int. Cl.
| | |
|---|---|
| *H04N 21/2187* | (2011.01) |
| *H04N 21/44* | (2011.01) |
| *H04L 29/08* | (2006.01) |
| *H04L 65/60* | (2022.01) |
| *H04L 67/02* | (2022.01) |
| *H04N 21/845* | (2011.01) |
| *H04N 21/262* | (2011.01) |
| *H04N 21/81* | (2011.01) |
| *H04N 21/2343* | (2011.01) |

(52) U.S. Cl.
CPC ..... *H04N 21/234* (2013.01); *H04N 21/23439* (2013.01); *H04N 21/26258* (2013.01); *H04N 21/44* (2013.01); *H04N 21/816* (2013.01); *H04N 21/8456* (2013.01)

(58) Field of Classification Search
CPC .. H04N 19/167; H04N 19/597; H04N 19/172; H04N 19/174; H04N 19/17; H04N 19/33; H04N 19/40; H04N 21/4728; H04N 21/234345; H04N 21/25825; H04N 21/44213; H04N 21/45455; H04N 21/45; H04N 21/45457; H04N 5/45; H04N 21/2187; H04N 21/234; H04N 21/23439; H04N 21/26258; H04N 21/44; H04N 21/816; H04N 21/8456
See application file for complete search history.

(56) References Cited

U.S. PATENT DOCUMENTS

| | | | | |
|---|---|---|---|---|
| 9,661,355 | B2* | 5/2017 | Ho | H04N 21/23614 |
| 9,973,740 | B2 | 5/2018 | Lee et al. | |
| 2010/0165081 | A1* | 7/2010 | Jung | H04N 13/178 |
| | | | | 348/46 |
| 2011/0122131 | A1* | 5/2011 | Bruls | H04N 19/597 |
| | | | | 345/419 |
| 2011/0304691 | A1* | 12/2011 | Newton | H04N 13/122 |
| | | | | 348/43 |
| 2013/0044108 | A1* | 2/2013 | Tanaka | G06T 15/04 |
| | | | | 345/419 |
| 2013/0195204 | A1* | 8/2013 | Reznik | H04N 21/44218 |
| | | | | 375/240.26 |
| 2014/0118509 | A1* | 5/2014 | Kroon | H04N 13/376 |
| | | | | 348/51 |
| 2015/0026242 | A1 | 1/2015 | Lim et al. | |
| 2015/0100702 | A1* | 4/2015 | Krishna | H04N 21/23439 |
| | | | | 709/231 |
| 2015/0193964 | A1* | 7/2015 | Kim | G06T 15/10 |
| | | | | 345/423 |
| 2015/0288864 | A1 | 10/2015 | Ollier | |
| 2016/0025982 | A1* | 1/2016 | Sutherland | G02B 27/0172 |
| | | | | 359/13 |
| 2016/0086379 | A1 | 3/2016 | Sadi et al. | |
| 2016/0191893 | A1* | 6/2016 | Gewickey | H04N 13/388 |
| | | | | 386/223 |
| 2016/0205418 | A1* | 7/2016 | Ho | H04N 21/23614 |
| | | | | 725/109 |
| 2016/0255412 | A1* | 9/2016 | Watanabe | G11B 27/10 |
| | | | | 725/116 |
| 2016/0337679 | A1 | 11/2016 | Lee et al. | |
| 2017/0127152 | A1 | 5/2017 | Hirabayashi et al. | |
| 2017/0155912 | A1* | 6/2017 | Thomas | H04N 21/23439 |
| 2017/0347026 | A1* | 11/2017 | Hannuksela | G09G 5/14 |
| 2017/0347163 | A1* | 11/2017 | Wang | G06T 9/00 |

FOREIGN PATENT DOCUMENTS

| | | |
|---|---|---|
| CN | 104519340 A | 4/2015 |
| WO | WO2015197818 | 12/2015 |
| WO | 2016048015 A1 | 3/2016 |

OTHER PUBLICATIONS

Li et al., "Multiple-views of regions of interest", International Organization for Standardization, ISO/IEC JTC1/SC29/WG11), Coding of Moving Pictures and Audio, Document No. MPEG2013/m31167, Geneva, Switzerland, Oct. 28, 2013, pp. 1-25.

Niamut et al., "Live Event Experiences—Interactive UHDTV on Mobile Devices", International Broadcasting Convention 2014, Amsterdam, The Netherlands, Sep. 11, 2014, pp. 1-8.

Maze et al., "Report on the Spatial Relationship Description Core Experiment," International Organization for Standardization, ISO/IEC JTC1/SC29/WG11, MPEG2013/m31603, pp. 1-12 (Oct. 28, 2013).

He et al., "Research on Key Technologies of Panoramic Image Stitching," Informatization Construction Issue No. 3 (Mar. 15, 2016).

* cited by examiner

METHOD AND NETWORK EQUIPMENT FOR ESTABLISHING A MANIFEST

REFERENCE TO RELATED EUROPEAN APPLICATION

This application claims priority from European Patent Application No. 16305604.7, entitled "Method and Network Equipment for Establishing A Manifest", filed on May 25, 2016, the contents of which are hereby incorporated by reference in its entirety.

TECHNICAL FIELD

The present invention relates generally to the domain of the adaptive streaming technology over, for instance but not exclusively, HTTP (HyperText Transfer Protocol) and, in particular, to the operation of a network equipment.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Adaptive streaming over HTTP (also called multi-bitrate switching or HAS) is quickly becoming a major technology for multimedia content distribution. Among the HTTP adaptive streaming protocols which are already used, the most famous are the HTTP Live Streaming (HLS) from Apple, the Silverlight Smooth Streaming (SSS) from Microsoft, the Adobe Dynamic Streaming (ADS) from Adobe, the Dynamic Adaptive Streaming over HTTP (DASH) developed by 3GPP and MPEG (standardized as ISO/IEC 23009-1:2012).

When a client terminal wishes to play an audiovisual content (or A/V content) in adaptive streaming, it first has to get a file describing how this A/V content might be obtained. This is generally done through the HTTP protocol by getting a description file, so-called manifest (or Media Presentations Description (MPD) for MPEG-DASH), from an URL (Uniform Resource Locator), but can be also achieved by other means (e.g. broadcast, e-mail, SMS and so on). The manifest—generated in advance and delivered to the client terminal by a remote server—basically lists the available representations (also called instances or versions) of such an A/V content (in terms of coding bitrate, resolution and other properties). A representation is associated with a given quality level (bitrate).

The whole data stream of each representation is divided into segments (also called chunks) of equal duration (e.g. few seconds), accessible by a separate URL), which are made such that a client terminal may smoothly switch from one quality level to another between two segments, in order to dynamically adapt to network conditions. When low bandwidth is available, client terminals request low bitrate chunks and they may request higher bitrate chunks should higher bandwidth becomes available. As a result, the video quality may vary while playing but rarely suffers from interruptions (also called freezes).

At the client side, the segments are selected based on a measure of the available bandwidth of the transmission path. In particular, a client terminal usually requests the representation of a segment corresponding to a bitrate encoding and thus a quality compliant with the measured bandwidth.

Besides, in the MPEG DASH standard, the Spatial Relationship Description (SRD) allows media presentation authors to express spatial relationships between spatial objects. A spatial object is defined as a spatial part of a content component (e.g. a region of interest, or a tile) and represented by either an adaptation set or a sub-representation. As an example, a spatial relationship may express that a video represents a spatial part of another full-frame video (for instance to allow zooming). In a further example, SRD may allow dividing a large view into a grid of smaller views where each smaller view is an actual representation.

Nevertheless, current MPEG-DASH SRD is currently not well adapted to provide virtual reality 360 experience, since it only supports a flat model in which all layouts are subset of a flat view.

SUMMARY

The invention concerns a method for establishing a manifest to be provided to a requesting terminal configured to receive a multimedia content divided into segments and provided by at least one remote network equipment, each segment being available in one or more representations, said manifest listing available representations for the multimedia content and specifying a plurality of adaptation sets, each adaptation set defining a spatial object of the multimedia content, the spatial objects of the adaptation sets defining a whole spatial object. Said method comprises:
  defining, in the manifest, a type of mapping of the multimedia content to said whole spatial object and a point of reference in one adaptation set of reference amongst said adaptation sets; and
  associating depth information with each adaptation set.

In an embodiment, the type of mapping can belong to the following group of mappings:
  spherical mapping;
  cylindrical mapping;
  cube mapping;
  pyramidal mapping.

In an embodiment, the point of reference can correspond to the center of the spatial object associated with the adaptation set of reference.

In an embodiment, each adaptation set being associated with a cell of a grid dividing spatially the multimedia content, the adaptation set of reference can correspond to an adaptation set associated with the whole grid.

In an embodiment, said method can further comprise defining coordinates associated with one or several adaptation sets specified in the manifest.

In an embodiment, the coordinates associated with each adaptation set can correspond to polar coordinates.

The present disclosure also concerns a manifest intended to be transmitted from one network equipment to a client terminal configured to receive a multimedia content divided into segments and provided by at least one remote network equipment, each segment being available in one or more representations, said manifest listing available representations for the multimedia content and specifying a plurality of adaptation sets, each adaptation set defining a spatial object of the multimedia content, the spatial objects of the adaptation sets defining a whole spatial object. Said manifest can comprise a type of mapping of the multimedia content to said whole spatial object, a point of reference in one adaptation set of reference amongst said adaptation sets and depth information associated with each adaptation set.

In an embodiment, the point of reference can correspond to the center of the spatial object associated with the adaptation set of reference.

In an embodiment, said manifest can comprise coordinates associated with one or several adaptation sets specified in the manifest.

Besides, the present disclosure also concerns a network equipment for establishing a manifest to be provided to a requesting terminal configured to receive a multimedia content divided into segments from a network equipment, each segment being available in one or more representations, said manifest listing available representations for the multimedia content and specifying a plurality of adaptation sets, each adaptation set defining a spatial object of the multimedia content, the spatial objects of the adaptation sets defining a whole spatial object. Said network equipment can comprise at least one memory and at least one processing circuitry configured to:

- define, in the manifest, a type of mapping of the multimedia content to said whole spatial object and a point of reference in one adaptation set of reference amongst said adaptation sets; and
- associate depth information with each adaptation set.

In an embodiment, said one processing circuitry can be further configured to define coordinates associated with one or several adaptation sets specified in the manifest.

The present disclosure further relies on a method for receiving a manifest by a requesting terminal configured to receive a multimedia content divided into segments and provided by at least one remote network equipment, each segment being available in one or more representations, said manifest listing available representations for the multimedia content and specifying a plurality of adaptation sets, each adaptation set defining a spatial object of the multimedia content, the spatial objects of the adaptation sets defining a whole spatial object. Said manifest can further define a type of mapping of the multimedia content to said whole spatial object and a point of reference in one adaptation set of reference amongst said adaptation sets; and associates depth information with each adaptation set.

The present disclosure is also directed to client terminal configured to receive a multimedia content divided into segments and provided by at least one remote network equipment, each segment being available in one or more representations, said client terminal being further configured to receive a manifest listing available representations for the multimedia content and specifying a plurality of adaptation sets, each adaptation set defining a spatial object of the multimedia content, the spatial objects of the adaptation sets defining a whole spatial object. Said manifest can further define a type of mapping of the multimedia content to said whole spatial object and a point of reference in one adaptation set of reference amongst said adaptation sets; and associates depth information with each adaptation set.

Besides, the present disclosure is further directed to a non-transitory program storage device, readable by a computer, tangibly embodying a program of instructions executable by the computer to perform a method for establishing a manifest to be provided to a requesting terminal configured to receive a multimedia content divided into segments and provided by at least one remote network equipment, each segment being available in one or more representations, said manifest listing available representations for the multimedia content and specifying a plurality of adaptation sets, each adaptation set defining a spatial object of the multimedia content, the spatial objects of the adaptation sets defining a whole spatial object, which comprises:

- defining, in the manifest, a type of mapping of the multimedia content to said whole spatial object and a point of reference in one adaptation set of reference amongst said adaptation sets; and
- associating depth information with each adaptation set.

The present disclosure also relies on a computer program product which is stored on a non-transitory computer readable medium and comprises program code instructions executable by a processor for implementing a method for establishing a manifest to be provided to a requesting terminal configured to receive a multimedia content divided into segments and provided by at least one remote network equipment, each segment being available in one or more representations, said manifest listing available representations for the multimedia content and specifying a plurality of adaptation sets, each adaptation set defining a spatial object of the multimedia content, the spatial objects of the adaptation sets defining a whole spatial object, which comprises:

- defining, in the manifest, a type of mapping of the multimedia content to said whole spatial object and a point of reference in one adaptation set of reference amongst said adaptation sets; and
- associating depth information with each adaptation set.

The method according to the disclosure may be implemented in software on a programmable apparatus. It may be implemented solely in hardware or in software, or in a combination thereof.

Some processes implemented by elements of the present disclosure may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements of the present disclosure can be implemented in software, the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like.

The disclosure thus provides a computer-readable program comprising computer-executable instructions to enable a computer to perform the method for establishing a manifest.

Certain aspects commensurate in scope with the disclosed embodiments are set forth below. It should be understood that these aspects are presented merely to provide the reader with a brief summary of certain forms the disclosure might take and that these aspects are not intended to limit the scope of the disclosure. Indeed, the disclosure may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which.

Wherever possible, the same reference numerals will be used throughout the figures to refer to the same or like parts.

DESCRIPTION OF EMBODIMENTS

Figure 1:
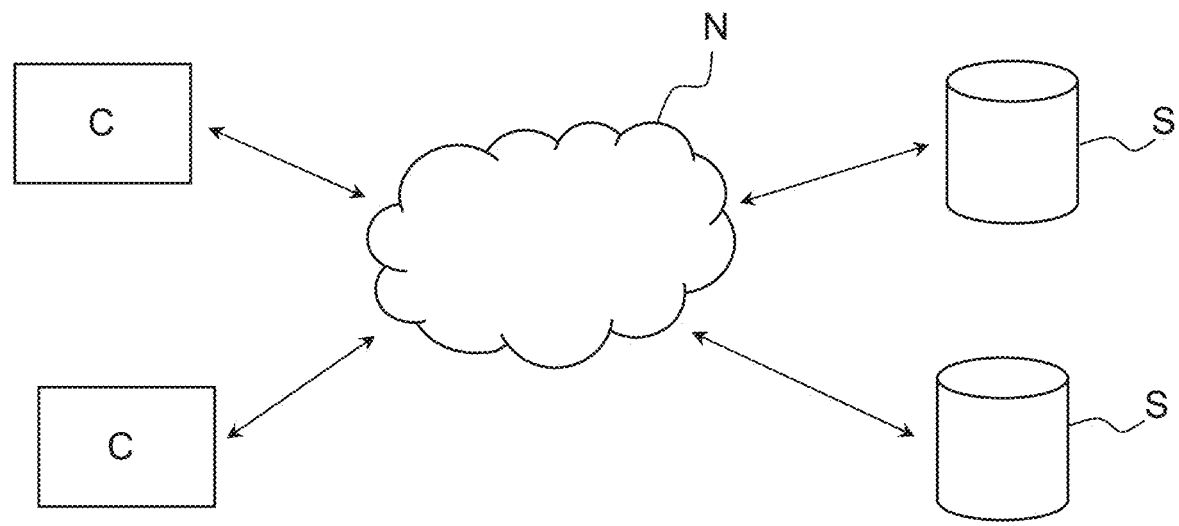
FIG. 1 is a schematic diagram of a Client-Server network used in some embodiments.

The following description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

In the claims hereof, any element expressed as a means and/or module for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In addition, it is to be understood that the figures and descriptions of the present disclosure have been simplified to illustrate elements that are relevant for a clear understanding of the present disclosure, while eliminating, for purposes of clarity, many other elements found in typical digital multimedia content delivery methods, devices and systems. However, because such elements are well known in the art, a detailed discussion of such elements is not provided herein. The disclosure herein is directed to all such variations and modifications known to those skilled in the art.

In the following, Figures are depicted in reference to the HTTP adaptive streaming protocol (or HAS) and, in particular, with regard to MPEG-DASH. Naturally, the disclosure is not restricted to such a particular environment and other adaptive streaming protocol could of course be considered and implemented.

As depicted in FIG. 1, the Client-Server network architecture, supported by one or several networks N (only one is represented in the Figures), implemented in some embodiments of the disclosure, comprises one or several client terminals C and one or several HTTP servers S. According to DASH, such servers S are also named Media Origin. They can generate for instance a manifest. Servers S are the sources of content distribution: the multimedia content may come from some external entity and be converted to HAS format at the Media Origin.

The client terminal C wishes to obtain a multimedia content from one of the HTTP servers SE. The multimedia content is divided into a plurality of segments (also called chunks). It is assumed that the multimedia content is available at different representations at a server S. A HTTP server S is able to stream segments to the client terminal C, upon client request, using HTTP adaptive streaming protocol over one or more TCP/IP connections.

Figure 2:
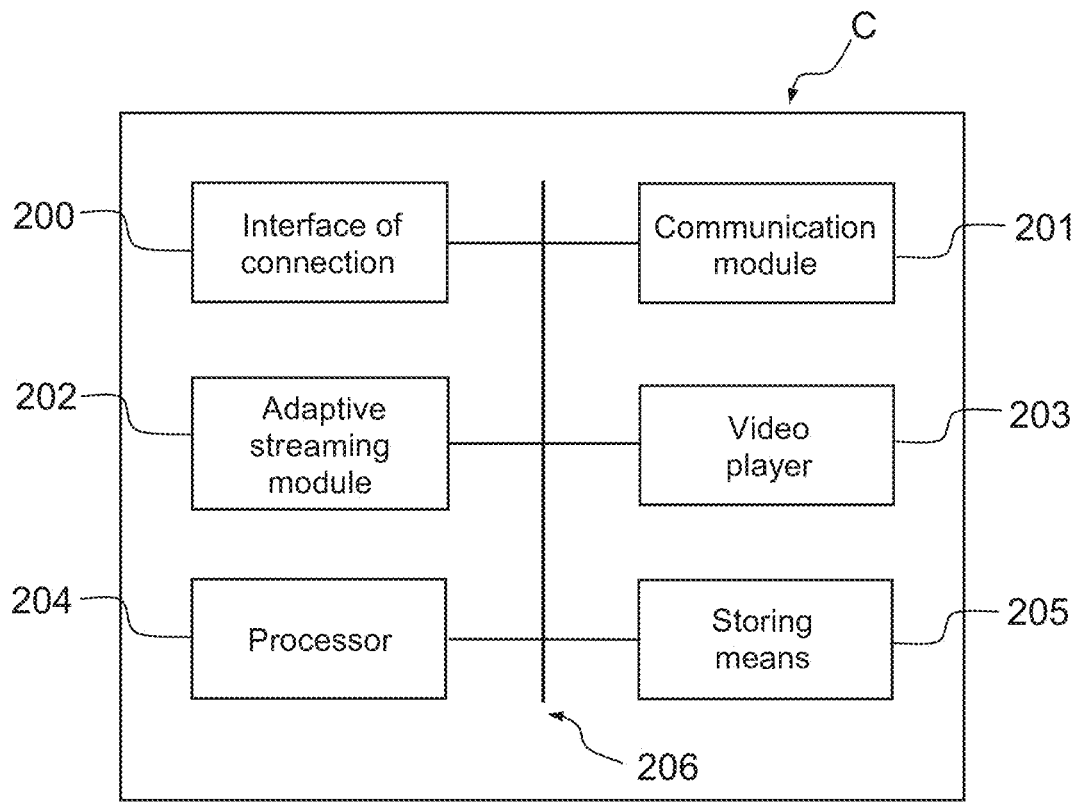
FIG. 2 is a block diagram of an example of a client terminal used in some embodiments.

As shown in FIG. 2, the client terminal C can comprise:
- an interface of connection 200 (wired and/or wireless, as for example Wifi, ADSL, Cable, Mobile and/or Broadcast (e.g. DVB, ATSC) interface) to the network N;
- a communication module 201 containing the protocol stacks to communicate with a HTTP server S. In particular, the communication module 201 can comprise the TCP/IP stack. Of course, it could be any other type of network and/or communicating means enabling the client terminal C to communicate with the HTTP server S;
- an adaptive streaming module 202 which can receive the HTTP streaming multimedia content from a HTTP server S. It continually selects the segment at the bit rate that better matches the network constraints and its own constraints;
- a video player 203 adapted to decode and render the multimedia content;
- one or more processors 204 for executing the applications and programs stored in a non-volatile memory of the client terminal C;
- storing means 205, such as a volatile memory, for buffering the segments received from the HTTP server SE before their transmission to the video player 203;
- an internal bus 206 to connect the various modules and all means well known to the skilled in the art for performing the generic client terminal functionalities.

The client terminal can be a portable media device, a mobile phone, a tablet or a laptop, a TV set, a Set Top Box, a game device or an integrated circuit. Naturally, the client terminal C might not comprise a complete video player, but only some sub-elements such as the ones for demultiplexing and decoding the media content and might rely upon an external means to display the decoded content to the end user. In this case, the client terminal C is a HTTP Adaptive Streaming (HAS) capable video decoder, such as a set-top box.

Figure 3:
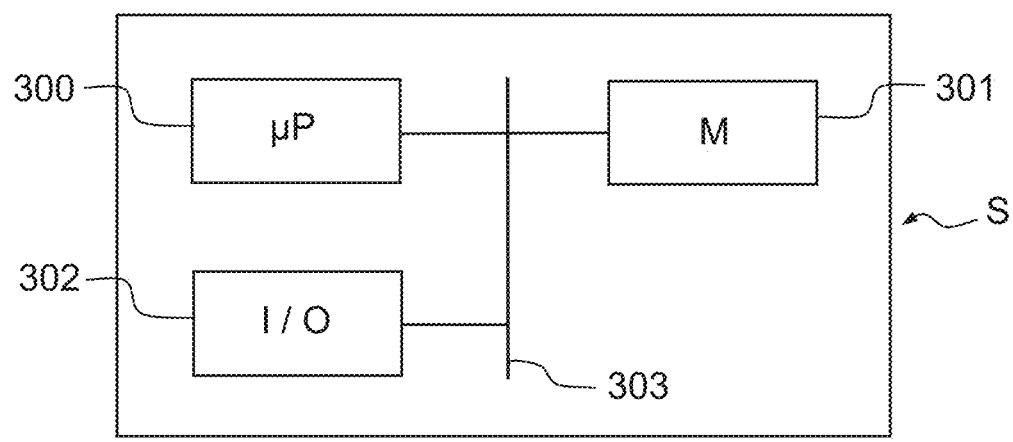
FIG. 3 is a block diagram of an example of a network equipment used in some embodiments.

FIG. 3 is a schematic block diagram of an example of a server S shown in FIG. 1. The server S can comprise a processing circuitry 300, a memory 301, a communication interface I/O 302 and a communication bus 303.

The processing circuitry 300 can be an electronic component capable of executing instructions and processing data. The processing circuitry 300 can comprise one or more processing units (CPU(s)). The processing circuitry 300 can be operative or configured to perform various signal processing and control functions of the server S. Also, the processing circuitry 300 can detect and process user's requests and can control its own operations and/or output control signals to control other elements of the server S (including elements not shown in FIG. 3) responsive to such user requests. The processing circuitry 300 can also be operative or configured to execute software code including software code for implementing the principle of the method described herein. The processing circuitry 300 can run various software programs and/or sets of instructions stored in the memory 301 to perform various functions for the server S and to process data.

The server S of FIG. 3 is further adapted to establish and deliver a manifest to a client terminal C requesting a multimedia content, through the network N. The manifest can comprise SRD (Spatial Relationship Description) information.

Figure 4:
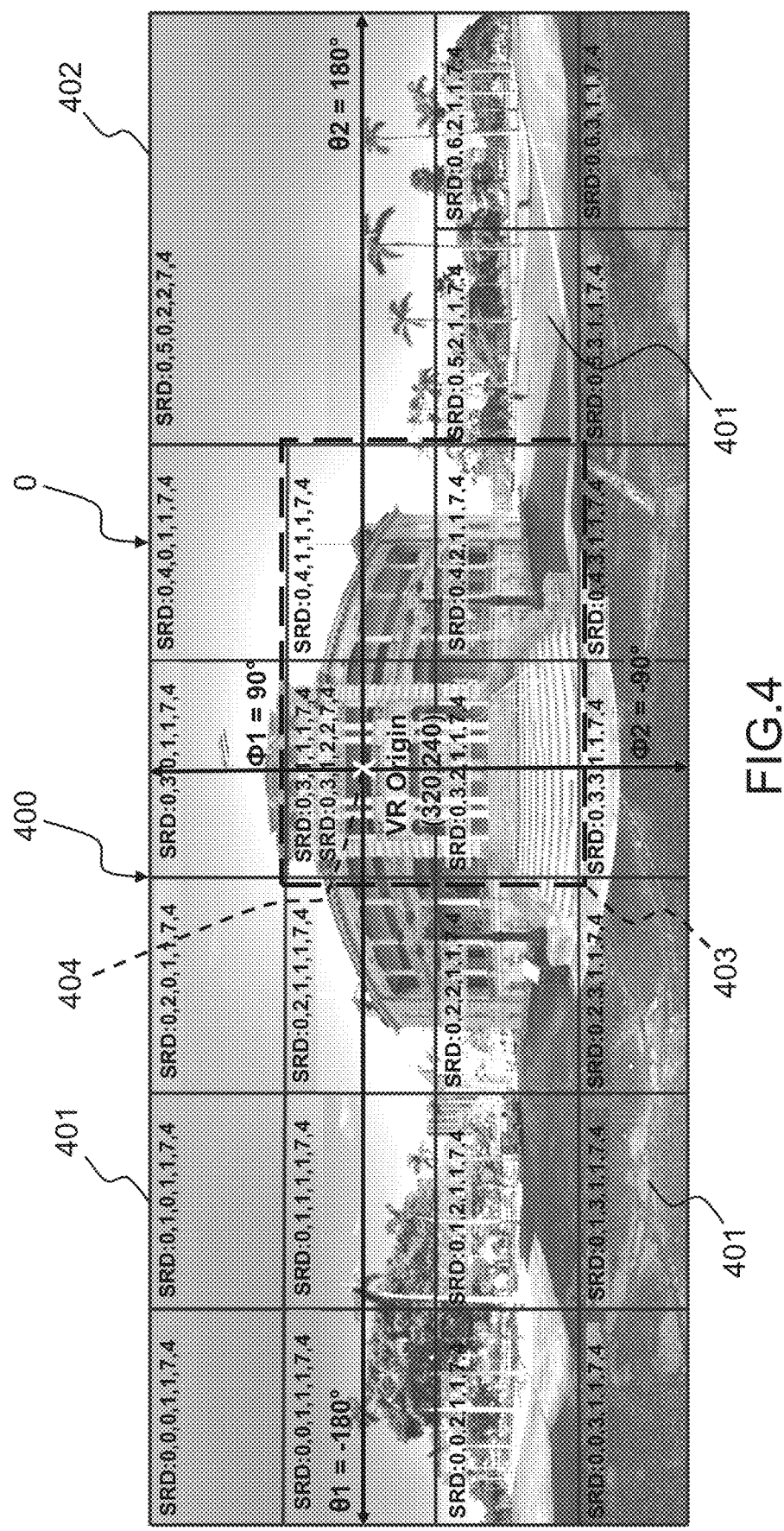
FIG. 4 shows some adaptation sets associated with a virtual reality content.

As shown in FIG. 4, SRD information can allow to divide a spatial rectangular object O into a grid 400 of smaller spatial objects, each cell 401, 402, 403 of the grid 400 corresponding to a spatial object (i.e. part of the whole spatial object O). Several videos (corresponding to the same content under different representations) can be associated with each cell 401, 402, 403 of the grid 400 to form an adaptation set. SRD defines the syntax to describe the grid 400 and each of its cells 401, 402, 403 in the manifest MPD. To this end, each adaptation set—defining one cell 401, 402, 403—can comprise a supplemental property defining a source id (all cells belonging to the same grid have the same source id), coordinates of the top left corner of the cell, height and width of the cell 401, 402, 403 and optionally height and width of the whole grid 400. Height and width can be expressed in arbitrary units (such as pixels) since they are only used to indicate proportions. It should be noted that an adaptation set can be associated with several cells 401 of the grid 400 (such as the cell 403 which comprises four cells 401) and that the cells of the grid 400 do not have necessarily the same dimensions (e.g. cells 401 and cell 402 as shown in FIG. 4).

In the example of FIG. 4, 27 adaptations sets are depicted: one main adaptation set associated with the grid 400, 24 adaptation sets associated with a small cell 401, one adaptation set associated with the big cell 402 and one adaptation set associated with the cell 403 (comprising 4 small cells 401).

Figure 5:
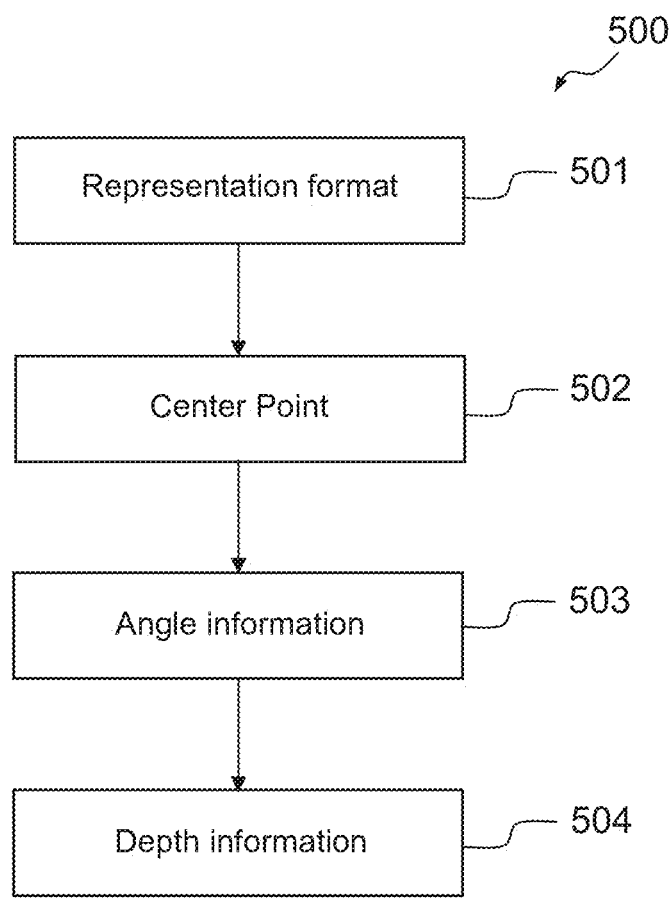
FIG. 5 is a flow chart illustrating a method for building a manifest according to some embodiments.

In an embodiment, in order to use SRD information for a virtual reality multimedia content, a server S can be configured to build a manifest according to the method 500 shown in FIG. 5. In particular, the server S can:
- define (step 501) which mapping (spherical, cylindrical, cube, pyramidal) is used for a virtual reality (VR) content (also called immersive content) to be rendered around the viewer (i.e. that the viewer is not able to see the entire picture but has to rotate his/her head (or to move) to see parts of the image out of his/her field of view);
- define (step 502) a center point (also called VR origin) 404 in the whole spatial object O. All angle values used in the further steps will be used with reference to this center point 404;
- associate (step 503) angle information to a minimum of cells 401, 402, 403 so that the MPEG-DASH SRD player of a client terminal C can compute angle information for each cells 401, 402, 403 of the grid 400 and choose the right video to retrieve when the user changes his/her point of view.

In order to define the VR mapping, at step 501, a new information (for instance supplemental or essential property, e.g. called "vrtype") can be introduced (e.g. thanks to the processing unit 300) in the manifest in the main adaptation set associated with the whole spatial object O. It should be noted that MPEG-DASH standard allows to define empty adaptation sets, for instance, in case no video entirely covers the whole spatial object O. Thus, in order to specify the VR mapping, an adaptation set associated with the whole spatial object O can be present (and possibly empty, i.e. without any video associated with). According to the MPD syntax, the supplemental or essential property can be identified thanks to a urn (uniform resource name) (for instance: urn:mpeg:dash:vrtype:2016) and its value can be a string comprising the VR mapping (for instance, "spherical", "cylindrical" or "cube").

In a variant, the supplemental property ("vrtype") can be introduced in the manifest in an adaptation set different from the main adaptation set.

Besides, in order to have an initial point of view and to define an origin axis from which all angles positions can be computed from, at step 502, a new information (for instance supplemental or essential property, e.g. called "vrcenter" or "vrorigin") can be introduced (e.g. thanks to the processing unit 300) in the manifest for the adaptation set comprising the center point 404. The position of the center point can for instance be given in pixel units from the top left corner of the corresponding grid cell in which the center point is located. The center point can be the center of the cell 401, 402, 403 associated with an adaptation set.

Such supplemental or essential property can be defined by a urn (for instance: urn:mpeg:dash:vrorigin:2016) and a value comprising x and y coordinates in pixel units.

As shown in the illustrative, but non limitative, example of FIG. 4, small cells 401 of the grid 400 comprising 640×480 pixels videos, the VR origin value is (320,240) and is associated with the adaptation set having the SRD value (0, 3, 1, 1, 1, 7, 4).

In a variant, the center point supplemental property may be set on the adaptation set associated with the whole spatial object. Such a variant can require more computation at the time of MPD authoring, since width and depth of all cells 401, 402, 403 between the center point 404 and the top left corner of the whole spatial object O need to be summed.

Figure 6:
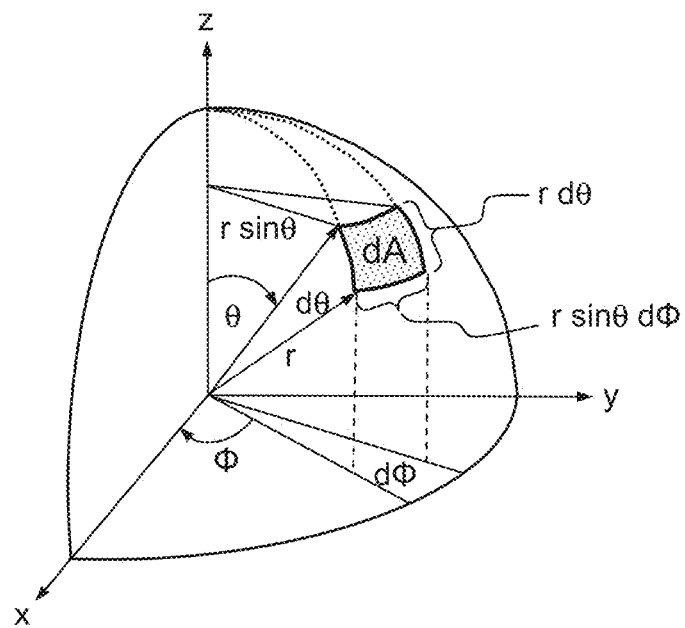
FIG. 6 illustrates a differential area view from a partial solid angle.

Moreover, in order for the DASH player of a client terminal C to have a correspondence between the point of view of the user (given, for instance, by polar coordinates (θ, φ) defining the partial solid angle dA, also called differential area, shown in FIG. 6) and the adaptation sets, polar coordinates information can be provided for one or several adaptation sets (all grid cells 401, 402, 403).

Figure 7:
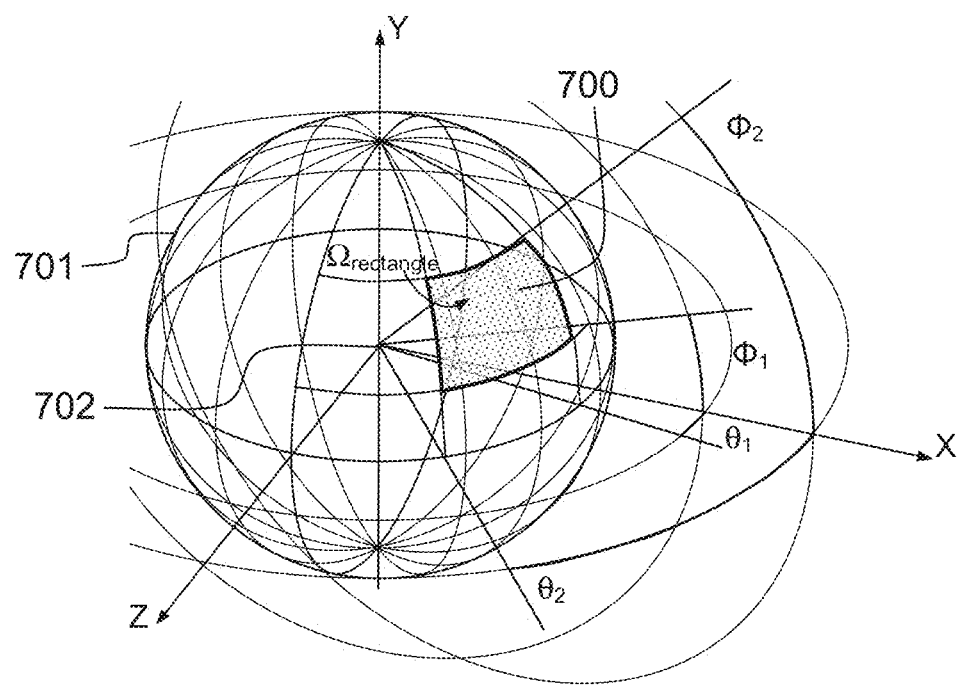
FIG. 7 shows the polar coordinates associated with one adaptation set depicted in FIG. 4.

In particular, polar coordinates for the whole spatial object O (associated with the main adaptation set) is relevant as it informs the DASH player of a client terminal C about possible limits for changing the user point of view. As shown in FIG. 7, right, left, top and bottom borders of the differential area 700 covered by the whole spatial object is given by four angles: $\theta 1$, $\theta 2$, $\varphi 1$ and $\varphi 2$. It has to be noted that, for the spherical mapping, the whole space (also called VR360) is obtained when $\theta 1 = \theta 2$, and $\varphi 1 = \varphi 2 + \pi$ (in radians).

In order to provide polar coordinates information, at step 503, a new information (for instance supplemental or essential property, e.g. called "vrcoordinates") can be introduced (e.g. thanks to the processing unit 300) in the manifest MPD for adaptation sets which can comprise $\theta 1$, $\theta 2$, $\varphi 1$ and $\varphi 2$ information. For instance, the supplemental or essential property can be identified by a urn (urn:mpeg:dash:vrcoordinates:2016) and the value "$\theta 1$, $\theta 2$, $\varphi 1$, $\varphi 2$" where angles are expressed, for instance, in degrees and $\theta 1$ is the angle between the VR origin 404 and the left side of the differential area 700, $\theta 2$ is the angle between the VR origin 404 and the right side of the differential area 700, $\varphi 1$ is the angle between the VR origin 404 and the top side of the differential area 700 and $\varphi 2$ is the angle between the VR origin 404 and the bottom side of the differential area 700.

As shown in the example of FIG. 4, the coordinates information of the main adaptation set associated with the whole spatial object O is "−180, 180, 90, −90".

For both, spherical and cylindrical mapping, VR coordinates supplemental information can only be given for the main adaptation set (associated with the grid 400) as size and position of all other adaptation sets (representing by cells 401, 402, 403) can be used to compute VR coordinates information for all other adaptation sets. Nevertheless, the server S can be configured to provide VR coordinates information for all adaptation sets rather than just for the main adaptation set.

For cube mapping, VR coordinates information should be present for adaptation sets associated with a face of the corresponding cube. When no video entirely covers a face of the cube (for instance when a face is covered by 4 videos), then an empty adaptation set associated with the whole face of the cube shall be created to carry the VR coordinates information for that face.

By providing angles information ($\theta$ and $\varphi$ in polar coordinates) to each of the differential area, a DASH client terminal C can decide which DASH representations need to be retrieved depending of what is the user solid angle point of view.

Thanks to the addition of vrtype, vrcenter and vrcoordinates supplemental information, the present disclosure allows to represent VR360 content as an SRD application. By associating depth information to adaptation sets, it also becomes possible to have videos rendered in front of VR360 content and therefore to offer a first level of 3D experience.

When the main adaptation set represents the entire differential area 700, it cannot be possible to render an object behind the differential area 700 (visible objects are arranged between the user eye (assumed as the center 702 of the sphere 701 on FIG. 7) and the background (corresponding for instance to the internal surface of the sphere 701)). To represent the depth of visible objects (not shown in the Figures), a percentage value indicating how far the object is arranged between the eye and the VR360 background video can be used. For instance, a value of 10% can represent an object located very close to the background, while a value of 90% can represent an object located very close to the eye 702.

To this end, at step 504, a new information (for instance supplemental or essential property, e.g. called "vrdepth") can be introduced (e.g. thanks to the processing unit 300) in the manifest and associated with one or several adaptation sets. For instance, the supplemental or essential property can be identified by a urn (urn:mpeg:dash:vrdepth:2016) whose value is a number indicating the percentage of how close an object is (for instance "10").

It should be noted that for adaptation sets part of the VR360 background, VR depth value can be "0" and does not need to be indicated. Only non-zero values of VR depth information can be defined in the MPD.

It should be further noted that if content author does not want individual objects to be displayed when a DASH client terminal C does not support VR depth information, then essential property mechanism could be used rather than supplemental property mechanism.

Upon request of a client terminal C for a VR content, a server S can build a manifest according to the method 500, said manifest comprising for instance the supplemental information "vrtype", "vrorigin", "vrcoordinates" and "vrdepth". Once generated by the server S, said manifest is further transmitted towards the requesting client terminal C through the network N.

The present disclosure allows DASH client terminals which support SRD to provide a VR360 experience thanks to supplemental property information added in the manifest MPD. In addition, compatible DASH clients may also be able to show VR360 contents with different depths. Indeed, by attaching depth information to SRD spatial objects (DASH representations), this allows positioning 3D videos ahead of the background $4\pi$ (or subset of $4\pi$) video. In order words, this allows not only to have a "VR360" or omnidirectional video experience but also to have a better 3D experience of it.

MPEG-DASH SRD can then be used to describe an omnidirectional video by organizing the $4\pi$ solid angle of the whole space into a grid of videos (DASH representations). The DASH client would therefore, for instance, retrieve full quality representation for what a user is currently watching, while retrieving lower quality representations for content currently out of user's view but which could become in the user's view very quickly if the users suddenly changes his point of view in the 3D space.

The present disclosure introduces additional information that, in addition to SRD, allows to build an interoperable division of the whole $4\pi$ space into a grid of well-positioned partial solid angles that cover the whole space. In addition, only a partial solid angle of the whole space can be described. In this case, the whole SRD "grid" only describes the portion of a sphere viewed from a partial solid angle.

To preserve the compatibility with legacy clients, the manifest could use SupplementalProperty and EssentialProperty in such a way that at least one representation can be interpreted by legacy clients after discarding the element containing EssentialProperty.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the method and device described. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

Although certain embodiments only of the disclosure have been described herein, it will be understood by any person skilled in the art that other modifications, variations, and possibilities of the disclosure are possible. Such modifications, variations and possibilities are therefore to be considered as falling within the scope of the disclosure and hence forming part of the disclosure as herein described and/or exemplified.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

The invention claimed is:

1. A method for establishing a manifest for a requesting terminal configured to receive a multimedia content divided into segments, each segment being available in one or more representations, said manifest listing available representations for the multimedia content and specifying a plurality of adaptation sets, each adaptation set defining a spatial object from a plurality of spatial objects of the multimedia content, the plurality of spatial objects of the adaptation sets defining a whole spatial object, comprising:
  defining, in the manifest, a type of mapping of the multimedia content to said whole spatial object;
  defining, in the manifest, a point of reference defining a center point or origin of said whole spatial object, in an adaptation set of reference amongst said plurality of adaptation sets;
  associating, in the manifest, depth information indicating a position of at least one spatial object between an eye of a user and a background of the multimedia content as a single value;
  whereby the depth information is provided for each respective adaptation set of the plurality of adaptation sets, for rendering the spatial object in front of the background of the multimedia content;
  wherein each adaptation set is associated with a cell of a grid that spatially divides the multimedia content; and
  wherein the adaptation set of reference corresponds to an adaptation set associated with a whole grid of the spatial object.

2. The method according to claim 1, wherein the type of mapping includes at least one of:
  spherical mapping;
  cylindrical mapping;
  cube mapping; and
  pyramidal mapping.

3. The method according to claim 1, wherein the point of reference corresponds to a center of the spatial object associated with the adaptation set of reference.

4. The method according to claim 1, further comprising defining coordinates associated with one or several adaptation sets specified in the manifest.

5. A non-transitory processor readable medium for storing a manifest for transmission to a client terminal configured to receive a multimedia content divided into segments, each segment being available in one or more representations, said manifest listing available representations for the multimedia content and specifying a plurality of adaptation sets, each adaptation set defining a spatial object from a plurality of spatial objects of the multimedia content, the plurality of spatial objects of the adaptation sets defining a whole spatial object, the manifest comprising:
  a type of mapping of the multimedia content associated with said whole spatial object, a point of reference defining a center point or origin of said whole spatial object in an adaptation set of reference amongst said adaptation sets and depth information indicating position of at least one spatial object between an eye of a user and a background of the multimedia content as a of a single value, whereby the depth information is provided for each respective adaptation set in the plurality of adaptation sets, for rendering of the at least one spatial object in front of the background of the multimedia content;
  wherein each adaptation set is associated with a cell of a grid that spatially divides the multimedia content; and
  wherein the adaptation set of reference corresponds to an adaptation set associated with a whole grid of the spatial object.

6. The non-transitory processor readable medium according to claim 5, wherein the point of reference corresponds to the center of the spatial object associated with the adaptation set of reference.

7. The non-transitory processor readable medium according to claim 5, comprising coordinates associated with one or several adaptation sets specified in the manifest.

8. A network equipment for establishing a manifest for a requesting terminal configured to receive a multimedia content divided into segments from a remote network equipment, each segment being available in one or more representations, said manifest listing available representations for the multimedia content and specifying a plurality of adaptation sets, each adaptation set defining a spatial object from a plurality of spatial objects of the multimedia content, the plurality of spatial objects of the adaptation sets defining a whole spatial object, comprising at least one memory function and at least one processor configured to:
  define, in the manifest, a type of mapping of the multimedia content to said whole spatial object; define, in the manifest, a point of reference defining a center point or origin of said whole spatial object, in an adaptation set of reference amongst said adaptation sets; associating depth information indicating position of at least one spatial object between an eye of a user and a background of multimedia content as a single value; and associate the depth information is provided for with each respective adaptation set of the plurality of adaptation sets, for rendering the spatial object in front of the background of the multimedia content;

wherein each adaptation set is associated with a cell of a grid that spatially divides the multimedia content; and wherein the adaptation set of reference corresponds to an adaptation set associated with a whole grid of the spatial object.

9. The network equipment according to claim 8, wherein said processor is further configured to define coordinates associated with one or several adaptation sets specified in the manifest.

10. A method for receiving a manifest by a requesting terminal configured to receive a multimedia content divided into segments, each segment being available in one or more representations, said manifest listing available representations for the multimedia content and specifying a plurality of adaptation sets, each adaptation set defining a spatial object from a plurality of spatial objects of the multimedia content, the plurality of spatial objects of the adaptation sets defining a whole spatial object, wherein the manifest further defines a type of mapping of the multimedia content to said whole spatial object; defines a point of reference defining a center point or origin of said whole spatial object, in an adaptation set of reference amongst said plurality of adaptation sets; and associates depth information indicating a position of at least one spatial object between an eye of a user and a background of the multimedia content as a single value, whereby the depth information is provided for each respective adaptation set of the plurality of adaptation sets for rendering of the at least one spatial object in front of the background of the multimedia content;

wherein each adaptation set is associated with a cell of a grid that spatially divides the multimedia content; and wherein the adaptation set of reference corresponds to an adaptation set associated with a whole grid of the spatial object.

11. A client terminal comprising a processor configured to receive a multimedia content divided into segments, each segment being available in one or more representations, said client terminal being further configured to receive a manifest listing available representations for the multimedia content and specifying a plurality of adaptation sets, each adaptation set defining a spatial object from a plurality of spatial objects of the multimedia content, the plurality of spatial objects of the adaptation sets defining a whole spatial object, wherein the manifest further defines a type of mapping of the multimedia content to said whole spatial object; defines a point of reference defining a center point or origin of said whole spatial object, in an adaptation set of reference amongst said adaptation sets; and associates depth information indicating position of at least one spatial object between the background of the multimedia content as a single value, whereby the depth information is provided for each respective adaptation set of the plurality of adaptation sets, for rendering of the at least one spatial object in front of the background of the multimedia content;

wherein each adaptation set is associated with a cell of a grid that spatially divides the multimedia content; and wherein the adaptation set of reference corresponds to an adaptation set associated with a whole grid of the spatial object.

12. The method of claim 1, further comprising:

associating angle information to a minimum number of adaptation sets from the plurality of adaptation sets;

computing angle information for each of the plurality of adaptation sets based on the angle information associated to the minimum number of adaptation sets.

* * * * *